United States Patent [19]

Stachowicz

[11] 4,320,700
[45] Mar. 23, 1982

[54] BARBECUE FORK HOLDER

[75] Inventor: Edward Stachowicz, Philadelphia, Pa.

[73] Assignee: BMS Roasting Equipment Corporation, Philadelphia, Pa.

[21] Appl. No.: 167,575

[22] Filed: Jul. 10, 1980

[51] Int. Cl.³ ............................................. A47J 37/04
[52] U.S. Cl. ................................ 99/421 HV; 126/30; 211/60 R; 248/125
[58] Field of Search ................. 99/419, 421 R, 421 H, 99/421 HH, 421 HV, 421 A; 211/60 R, 70; 126/25 R, 25 A, 30; 248/125; D7/129, 130

[56] References Cited

U.S. PATENT DOCUMENTS

| 228,998 | 6/1880 | Johnston | 211/70 |
| 1,061,431 | 5/1913 | West | 99/419 |
| 3,483,816 | 12/1969 | Lombardi | 99/421 R |

FOREIGN PATENT DOCUMENTS

| 2502211 | 7/1976 | Fed. Rep. of Germany | 99/419 |
| 19462 | of 1900 | United Kingdom | 99/421 R |
| 610367 | 10/1948 | United Kingdom | 99/419 |

*Primary Examiner*—Billy J. Wilhite
*Attorney, Agent, or Firm*—Seidel, Gonda, Goldhammer & Panitch

[57] ABSTRACT

An apparatus is provided for suspending one or more long-shafted forks in a vertical position for storage and in a horizontal operative position whereby the forks may be used to hold food over an open heat source. The apparatus comprises a base having dimensions sufficient to provide vertical stability, a stand post mounted vertically to the base, an upper bracket adapted to hold the forks vertically at the handles, and a lower bracket having a cradle and hook retaining means for retaining the forks horizontally in the second operative position. The lower bracket is also vertically movable along the stand post, and the hook and cradle retaining means are pivotable about a cross bracket portion of the lower bracket whereby the forks may be adjusted horizontally over the heat source.

9 Claims, 4 Drawing Figures

BARBECUE FORK HOLDER

BACKGROUND OF THE INVENTION

This invention is related to a stand for cooking forks. More particularly, it is related to a stand which may be used to hold a set of barbecue forks in both a stored position and in an operative position.

It is common to use barbecue forks for the cooking of food in a fireplace, or over a campfire or charcoal, etc. Hot dogs, marshmallows and various specialties such as shish kebobs are often cooked in this manner. Heretofore, a set of such forks would normally be stored in a container or box of some sort. Unless the forks were held manually, it was necessary to provide an additional support apparatus for the forks to hold the food over the heat source.

It is an object of this invention to conveniently provide a stand for the storage of barbecue forks that also can easily be used to support the forks in an operative position over a fire. It is an additional objective to provide means for easily positioning the forks in vertical and lateral directions. These and other advantages of the present invention will become apparent upon reading the disclosure.

SUMMARY OF THE INVENTION

An apparatus is provided for supporting one or more forks in a first position for storage and in a second operative position whereby the forks may be used to hold food over an open heat source. The apparatus comprises a base, a stand post, an upper bracket adapted to hold the forks in a stored position and a lower bracket adapted to hold the forks in an operative position. The upper bracket is attached at the top of the stand post and provides a handle for the apparatus. The upper bracket also has U-shaped cut-outs for suspending the forks at the fork handles. The lower bracket is movable vertically on the stand post and comprises two or more fork supporting brackets pivotably attached to a cross bracket. The fork supporting brackets each have a U-shaped cradle member at one end for supporting the shaft of a fork and a hook-shaped support at the other end to hold the fork in a substantially horizontal position against the weight of the fork.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENTS

Figure 1:
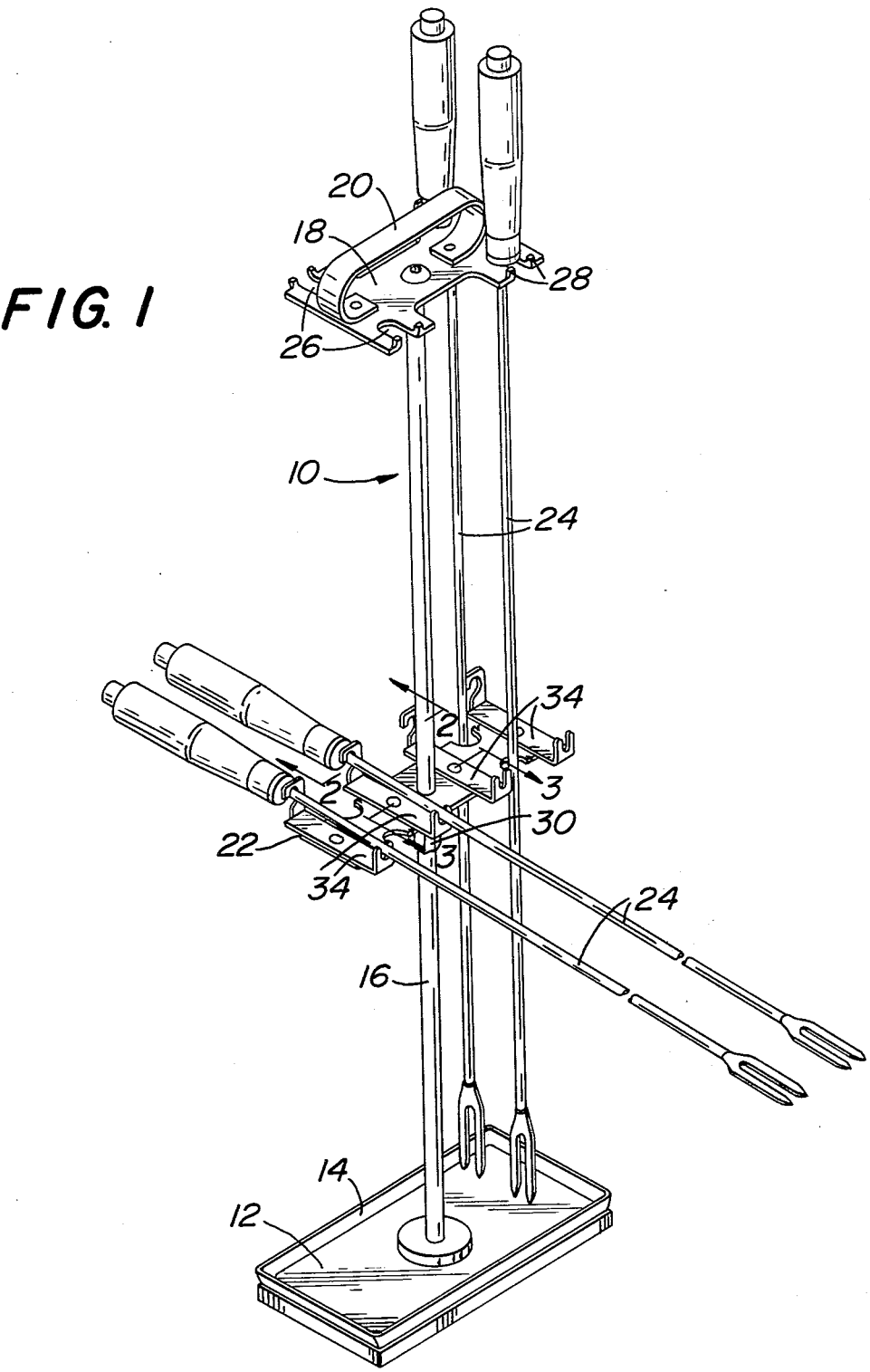
FIG. 1 is a perspective view of an apparatus according to the present invention.
Figure 2:
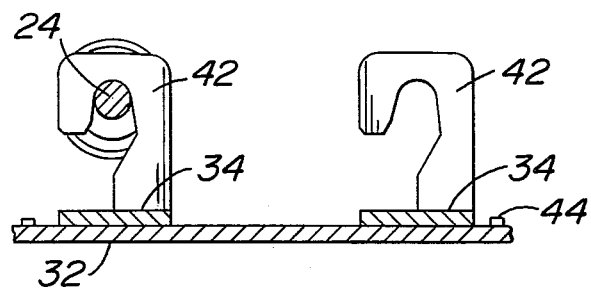
FIG. 2 is a sectional view of the apparatus of FIG. 1 along the line 2—2.

Referring to the drawings in detail, wherein like numerals indicate like elements, there is shown in FIG. 1 a fork holder 10 according to the present invention. Holder 10 comprises a base 12, a vertical stand post 16, upper bracket 18, and lower bracket 22. Base 12 may be of any suitable shape and material having sufficient weight and dimensions to provide vertical stability. As shown in FIG. 1, it is presently preferred to provide a base 12 of rectangular shape and further to provide a slightly flared rim 14 around the border of base 12 in order to catch any drippings from the tines of the fork.

Vertical stand post 16 is mounted near the center of base 12 and projects vertically above base 12. Stand post 16 may be an elongated cylindrical rod as shown in FIG. 1, and should have a length greater than the shaft length of the forks.

Upper bracket 18 is attached at the top of stand post 16. A handle 20 is mounted on bracket 18 for convenience in carrying. Bracket 18 has four U-shaped cut-outs 26 having a width larger than the diameter of the shafts of forks 24 but smaller than the diameter of the handles of forks 24. Thus, the shaft of a fork 24 may be inserted into a U-shaped cut-out, and the fork 24 lowered until the handle rests on bracket 18. In this manner, forks 24 may be held in a stored position. At each edge of the mouth of cut-outs 26, there is provided a cleat 28. Cleats 28 prevent the forks 24 from sliding out of the cut-outs 26 after they have been lowered into position with their handles resting on bracket 18. It should be noted that shapes other than a U may be employed for the same purpose. It is enough to provide an opening or notch having dimensions sufficient to hold the fork at the handle.

Figure 3:
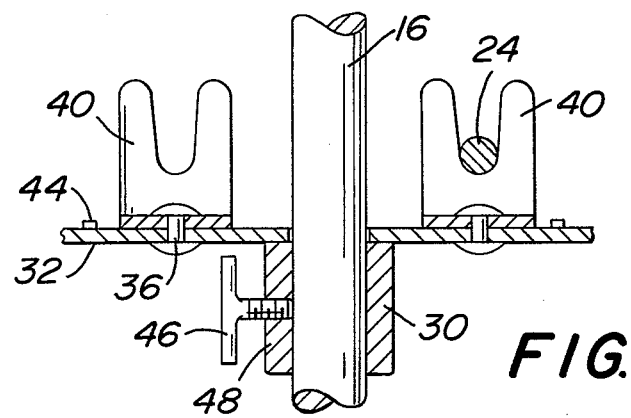
FIG. 3 is a sectional view of the apparatus of FIG. 1 along the line 3—3.
Figure 4:
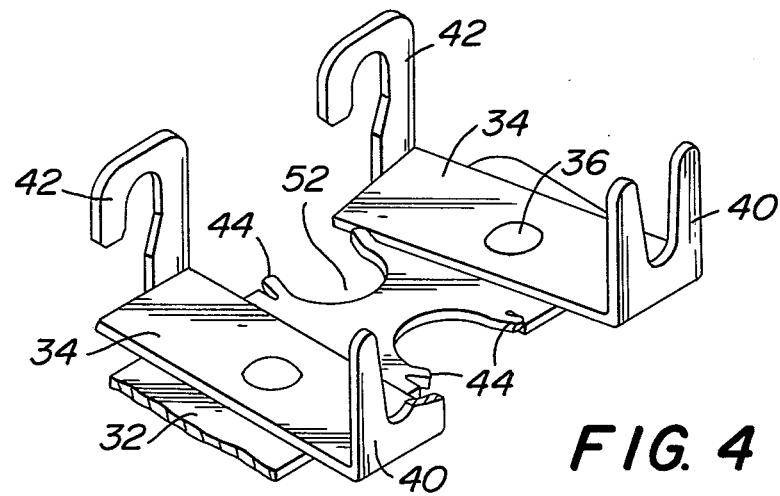
FIG. 4 is a perspective view of a portion of the lower bracket of the apparatus shown in FIG. 1.

Bottom bracket 22 has an aperture in its center through which stand post 16 extends. A collar 30 is attached to the bottom surface of bracket 22. Bracket 22 comprises a cross bracket 32 and four fork support brackets 34, two on each side of stand post 16. Brackets 34 are identical. As shown in FIG. 3, each fork support bracket 34 is pivotably attached to cross bracket 32 by a rivet 36. Each fork support bracket 34 has on one end thereof a U-shaped cradle member 40, and at the other end thereof has a hook-shaped member 42. As may be seen from FIG. 1, the shaft of a fork 24 may be placed in a cradle member 40 and the shaft hooked under the hook-shaped member 42 at the opposite end. When the fork 24 is pushed all the way forward so that the handle of fork 24 is adjacent to hook-shaped member 42, the fork 24 will be balanced in such a manner that the twisting moment on fork 24 at the fulcrum point provided by cradle 40 is such that the tines of the fork want to fall and the handle of the fork wants to rise. This pivoting moment is counteracted by hook member 42 whereby fork 24 is held firmly in a horizontal position. The weight of a morsel of food on the tines of fork 24 exaggerates the pivoting moment and holds fork 24 even more firmly in place.

Fork support brackets 34 may be pivoted in a lateral direction around rivet 36. However, to prevent the forks from being pivoted so far that they contact each other, raised stops 44 are provided on cross bracket 32. Fork support brackets 34 may only be pivoted toward each other for a short distance before they are stopped by raised stops 44.

A vertical adjustment set screw 46 is provided in a threaded aperture 48 of collar 30. Screw 46 should have a generally flat friction producing tip for contacting stand post 16 and thereby securing bottom bracket 22 against vertical movement. Screw 46 may be loosened in order to move bottom bracket 22 vertically along stand post 16. When the proper height relative to the heat source is established, screw 46 may be tightened.

The cross bracket member 32 of bottom bracket 22 also has four C-shaped cut-outs 52. These cut-outs are provided so that when the forks 24 are stored in position on top bracket 18, the shafts of forks 24 may hang vertically in the cut-outs 52 and movement of the lower part of the shafts is restricted to three directions.

Any suitable variety of barbecue forks may be used for forks 24. The forks depicted are fork-within-a-fork combinations as disclosed in my co-pending patent application Ser. No. 167,574 filed this same day. However, the term fork should be read broadly in this specification and in the claims to include a skewer or like device.

The present invention may be embodied in other specific forms without departing from the spirit or essential attributes thereof and, accordingly, reference is made to the appended claims, rather than to the foregoing specification, as indicating the scope of the invention.

I claim:

1. An apparatus for supporting one or more long-shafted forks in a first vertical position for storage and in a second operative position whereby the forks may be used to hold food over an open heat source, comprising:
   (a) a base having dimensions sufficient to provide vertical stability;
   (b) a stand post mounted vertically to the base and having a length greater than the shaft of a fork to be supported thereon;
   (c) an upper bracket attached to said post and adapted to hold the forks in a first vertical position; and
   (d) a lower bracket attached to said post at an elevation below said upper bracket and adapted to hold the forks in said second position, said lower bracket including a cross bracket to which there are pivotably attached two or more fork supporting brackets for holding the forks in a substantially horizontal position.

2. An apparatus as in claim 1 wherein the upper bracket is a member disposed in a plane perpendicular to the longitudinal axis of the stand post and has disposed thereon one or more openings having a width larger than the diameter of the shafts of the forks and smaller than the diameter of a handle of the forks, whereby a fork may be stored in the first position by inserting the shaft of a fork into an opening and lowering the fork until the handle of said fork rests on the upper bracket.

3. An apparatus as in claim 2 further comprising a small cleat at each edge of the mouths of the openings for retaining the forks from sliding out of the openings.

4. An apparatus as in claim 1 wherein the lower bracket is movable vertically along the stand post, and means for selectively securing the lower bracket to said post at any desired elevation along the post.

5. An apparatus as in claim 1 wherein the fork supporting brackets each have a cradle member at one end for supporting the shaft of a fork and a hook-shaped member at the other end whereby the shaft of a fork may be supported by the cradle member and the fork is held in position by the weight of the fork against the hook member.

6. An apparatus as in claim 5 wherein each fork supporting bracket is pivotably attached to the cross bracket, whereby adjustment of the direction of the fork in a lateral plane may be made by pivoting the fork supporting bracket.

7. An apparatus as in claim 6 wherein mechanical stops are provided to limit the amount of rotation of the fork supporting brackets relative to the cross bracket.

8. An apparatus as in claim 7 wherein the securing means is a collar around the stand post under the bottom bracket and having a threaded aperture through one wall thereof, and a screw adapted to be threaded into or out of said aperture to contact the stand post and secure the collar relative to the stand post by friction between the screw tip and the stand post.

9. An apparatus for supporting one or more long-shafted forks in a first position for storage and in a second operative position whereby the forks may be used to hold food over an open heat source, comprising:
   (a) a base having dimensions sufficient to provide vertical stability;
   (b) a stand post mounted vertically to the base and having a length greater than the shaft of the fork to be supported thereon;
   (c) an upper bracket attached to said post and adapted to support the forks vertically in said first position; and
   (d) a lower bracket attached to said post and having retaining means thereon for retaining said forks horizontally in said second operative position and said lower bracket being vertically movable along the stand post toward and away from the upper bracket whereby the lower bracket may be adjusted to a desired elevation.

* * * * *